United States Patent Office 3,357,361
Patented Dec. 12, 1967

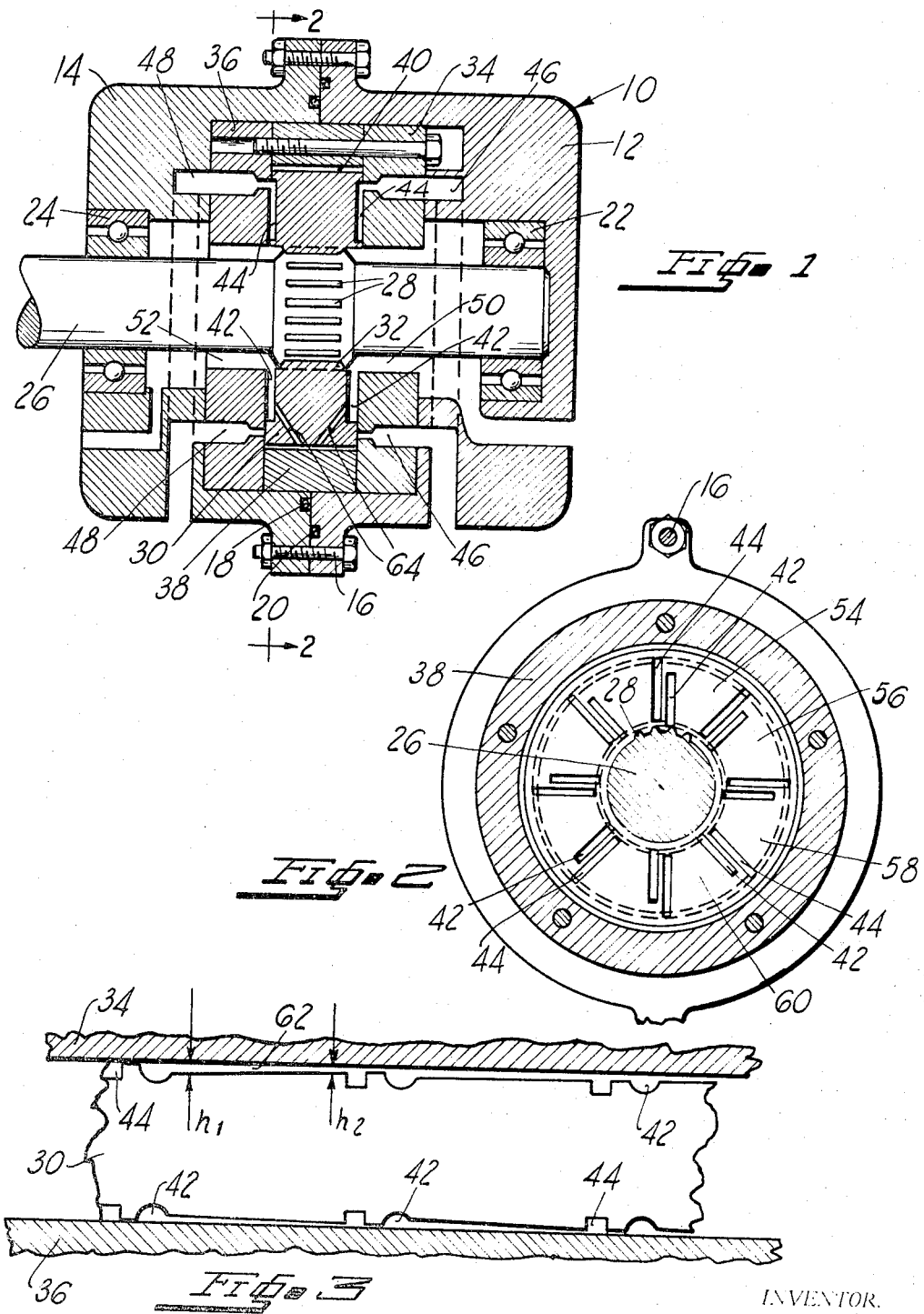

3,357,361
HIGH VELOCITY PUMP
Robert W. Scott, South Bend, Ind., assignor to The
Bendix Corporation, a corporation of Delaware
Filed Oct. 21, 1965, Ser. No. 500,415
4 Claims. (Cl. 103—84)

ABSTRACT OF THE DISCLOSURE

A pump having a rotor rotatably arranged between port plates with the rotor having on each side a plurality of inlet and outlet slots connected by wedge shaped cavities which are of greater dimension adjacent the inlet slots.

This invention relates to a fluid power device in the form of a pump based upon the principle of the hydrodynamic wedge.

The hydrodynamic wedge principle was first developed in the hydrodynamic bearing theory wherein a journalled or slipper bearing can be shown to depend on the load supporting abilities of a wedge of fluid built up in the bearing clearance by rotation of the journal. This action was discovered by Tower in 1883 and later explained on the basis of hydrodynamic theory of Professor Osborne Reynolds in 1886. The theory was later further developed by Kingsbury in the United States and Michell in Great Britain who applied the hydrodynamic oil wedge theory to thrust bearings giving them performance equal to the best journal bearing.

It is thus a principal object of this invention to take advantage of this principle in the construction of the high velocity pump.

As may well be appreciated by those skilled in the art to which the invention relates, there is an ever increasing need for high velocity pumps to, for example, work as fuel pumps for gas turbine engines. The problems involved in matching a pump to a gas turbine engine include that of maintaining a drive mechanism which will accommodate the r.p.m. requirements of efficient pumping mechanism. It is therefore another object of this invention to provide a pumping mechanism which may be driven directly from a gas turbine drive and which is not affected by low or high r.p.m. of the turbine drive.

Still another object of this invention is to provide a rotary pump that is constructed so as to eliminate any possibility of binding of the rotor due to distortion or shaft misalignment.

A still further object of this invention is to provide a rotary pump which utilizes a means to pressure suspend the rotor that will not only double the output capacity, but provide axial hydraulic balance to eliminate all end loads on the rotor.

Still yet another object of this invention is to provide a rotary pump having a flow circulation which will permit ready heat dissipation.

Other and further objects of this invention will appear from the following description of the drawings in which:

FIGURE 1 is a cross sectional view of a pump in accordance with the principles of my invention;

FIGURE 2 is an end view of the pump rotor within the pump housing taken along lines 2—2 of FIGURE 1; and FIGURE 3 is a plan view of the pump rotor between the stator plates.

With more particular regard to FIGURE 1 there is shown a pump 10 having front and rear housing sections 12 and 14, respectively, that are bolted together as at 16 to enclose a pumping chamber. At the juncture of the portions 12 and 14, a pair of annular seals 18 and 20 are provided to seal the pumping chamber thereby enclosed. At each end of the housing portions there are provided bearings 22 and 24 that rotatably support a shaft 26 driven by any appropriate drive means such as a gas turbine engine. The shaft 26 is splined as at 28, and a pump rotor 30 is provided with splines 32 that loosely mate with the splines 28 to unite the rotor 30 and shaft 26. This construction permits the rotor to run free between a pair of stator plates 34 and 36 on opposite sides of the rotor within the chamber of the pump 10. In fact, the rotor 30 is mounted between the flat stator plates to have a very small end clearance (.0002″ or .0003″) by joining the stator plates 34 and 36 together with an annular spacer ring 38 whose inner diameter is greater than the outer diameter of the rotor to provide an annular space 40 between the periphery of the rotor and the ring 38.

With reference now to FIGURE 2 showing an end view of the rotor, it may be seen that the rotor is divided into eight segments which are separated by radial slots 42 and 44. The radial or first slot 42 is milled from the center bore outwardly, whereas the second slot or outlet slot 44 is milled from near the outermost portion of the rotor radially inwardly about two-thirds through the radial width of the rotor. Referring back to FIGURE 1, it should be noted that the slots 42 and 44 are formed on each side of the rotor.

Each of the stators 34 and 36 is appropriately drilled to provide annular chambers 46 and 48 that are radially positioned to overlie the slots 44 of the rotor 30. Furthermore, the stators 34 and 36 are provided with central openings forming inlet chambers 50 and 52 about the shaft 26 that will open into the slots 42 of the rotor 30.

The eight segments (54, 56, 58, 60, etc.) are machined to have an angular taper deepest adjacent the inlet slots 42 and shallowest adjacent the outlet slots 44. Thus, when the rotor 30 is inserted between the flat faces of the stators 34 and 36, a wedge shaped cavity is formed between the inlet and outlet slots on both sides of the rotor 30. This wedge shaped cavity is better shown in the plan view of FIGURE 3 as at 62.

In operation of the pump 10, the rotor 30 is turned by the power put into the drive shaft 26 and fluid is drawn into the inlet slots 42 by centrifugal action. The fluid then fills the wedge shaped segment 62 formed between the rotors and stators. The dimensions of the thickness of the wedge being very small causes the formation of a hydrodynamic wedge which builds up the pressure in this fluid. This pressurized fluid is then carried into the outlet slot 44 and into the discharge porting of the pump. It is very important to note that the rotor has segments machined on both sides. This, of course, doubles the capacity, but more important also provides axial hydraulic balance which eliminates all end loads on the rotor. This is an important feature since it allows the rotor to float between the end plates and thus greatly reduces friction.

With reference back to FIGURE 1, it should be noted that the annular area 40 between the rotor and the outer ring 38 is vented by means of passages 64 back to the inlet slots 42 in the rotor. This is a feature which would further reduce the loading in the pump.

If desired, automatic pressure compensation can be provided by the device aforedescribed by a fairly simple procedure. This is based on the fact that pressure generated in the hydrodynamic wedge is a function of the difference in film thickness at each end of the wedge ($h_2-h_1$). Thus, if one end plate were made movable, this clearance could be adjusted to provide any desired discharge pressure. Conventional methods of discharge pressure sensing and actuation of control would be employed and are not shown in the drawings. The scope of my invention is set forth by the appended claims.

I claim:
1. A high velocity pump comprising:
   a housing having a chamber therein with inlet and outlet ports leading from said chamber to the exterior of said pump;
   a shaft rotatably supported by said housing;
   a port plate means operatively connected to said housing in said chamber, said port plate means comprised of two axially spaced stators each having a central annular passage connected to said inlet port and another annular passage radially spaced from said central annular passage which another annular passage is connected to said discharge port whereby fluid flow is directed from the center of said chamber to the radial extremities thereof thereby transferring heat of operation to the outer extremities of the housing where it may be more readily dissipated; and
   a pump means operatively connected to said shaft between said stators, said pump means having a plurality of radial passages overlying said central annular passage of each of said spaced stators and another plurality of passages overlying each of said another annular passages on both sides of said rotor which passages are connected by a surface of decreasing depth from said plurality of radial passages overlying said central annular passage to said plurality of passages overlying said another annular passage to draw fluid from said central annular passage of each of said stators as said pump means is being rotated by said shaft and compress the fluid while directing it radially outwardly to deliver the compressed fluid to the another annular passage which is the outermost passage of said stators.

2. A high velocity pump comprising:
   a housing having a chamber therein with inlet and outlet ports leading from said chamber to the exterior of said pumps;
   a shaft rotatably supported by said housing;
   a port plate means operatively connected to said housing in said chamber, said port plate means including two axially spaced stators each having a central annular passage therethrough and another annular passage therethrough radially spaced from said central annular passage which central annular passage is connected to said inlet port and which said another annular passage is connected to said outlet port so that fluid flow is directed from the center of said chamber to the radial extremities thereof thereby transferring heat of operation to the outer extremities of said housing where it may be more readily dissipated; and
   a pump means operatively connected to said shaft to be revolvable between said two axially spaced stators, said pump means including a rotor loosely splined to said shaft and operatively arranged between said stators, said rotor having a first radial slot on each side open at its innermost end to said central passage of each of said stators and sealed from another annular passage through said stator, a second radial slot on each side of the rotor and arcuately spaced from said first radial slot on each side thereof, said second slot open to each of said another passages in each of said stators and sealed from said central passages thereof and each arcuate segment between said first and second slots being tapered to form a plurality of wedge shaped cavities between said stators on each side of said rotor such that said rotor is pressure suspended to eliminate pressure loading thereon when said rotor is revolved by said shaft to draw fluid from the innermost passage of said port plate, compress the fluid while directing it radially outwardly and deliver the fluid to the outermost passage of said port plate means.

3. A high velocity pump comprising:
   a housing having a chamber therein with inlet and outlet ports leading from said chamber to the exterior of said pumps;
   a shaft rotatably supported by said housing;
   a port plate means operatively connected to said housing in said chamber, said port plate means including two axially spaced stators each having a central annular passage therethrough and another annular passage therethrough radially spaced from said central annular passage which central annular passage is connected to said inlet port and which said another annular passage is connected to said outlet port so that fluid flow is directed from the center of said chamber to the radial extremities thereof thereby transferring heat of operation to the outer extremities of said housing where it may be more readily dissipated; and
   a pump means operatively connected to said shaft to be revolvable between said two axially spaced stators, said pump means including a rotor loosely splined to said shaft and operatively arranged between said stators, said rotor having a first radial slot on each side open at its innermost end to said central passage of each of said stators and sealed from another annular passage through said stator, a second radial slot on each side of the rotor and arcuately spaced from said first radial slot on each side thereof, said second slot open to each of said another passages in each of said stators and sealed from said central passages thereof and each arcuate segment between said first and second slots being tapered to form a plurality of wedge shaped cavities between said stators on each side of said rotor such that said rotor is pressure suspended to eliminate pressure loading thereon, said wedge shaped cavities being deeper adjacent the first slot than adjacent the second slot.

4. A high velocity pump comprising:
   a housing having a chamber therein with inlet and outlet ports leading from said chamber to the exterior of said pump;
   a shaft rotatably supported by said housing;
   port plate means operatively connected to said housing in said chamber having radially spaced passages respectively connected to said inlet port and to said outlet port so that fluid flow is directed from the center of said chamber to the radial extremities thereof thereby transferring heat of operation to the outer extremities of said housing where it may be more readily dissipated; and
   a pump means operatively connected to said shaft, said means including a rotor dimensioned with respect to said chamber of said housing to form an annular chamber between the rotor means and the housing, said rotor also having radial passages of decreasing depth facing said port plate means to draw fluid from the innermost passage of said port plate, compress the fluid while directing it outwardly and deliver the fluid to the outermost passage of said port plate means; and a vent means communicating the passage of said port plate means connected to said inlet port to said annular chamber to provide a flow path back to said inlet port from said annular chamber for fluid leakage about said rotor to eliminate the possibility of the leakage fluid building up a pressure putting a loading upon the rotor that would hinder the operation thereof.

References Cited

UNITED STATES PATENTS

| | | | |
|---|---|---|---|
| 3,037,457 | 6/1962 | Sternlicht | 103—84 |
| 3,123,861 | 3/1964 | Westover | 103—84 |

HENRY F. RADUAZO, *Primary Examiner.*